Jan. 20, 1942.  L. N. HUNTER ET AL  2,270,440
APPARATUS FOR HEATING LIQUIDS
Filed Nov. 24, 1939  2 Sheets-Sheet 2
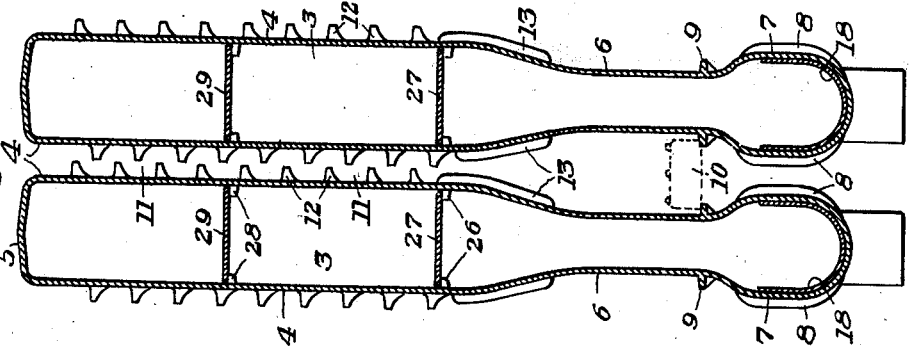
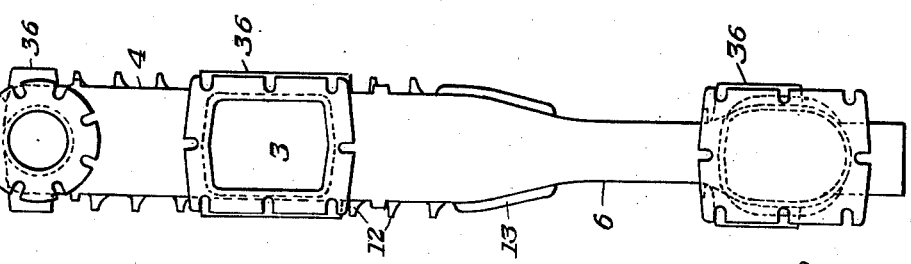
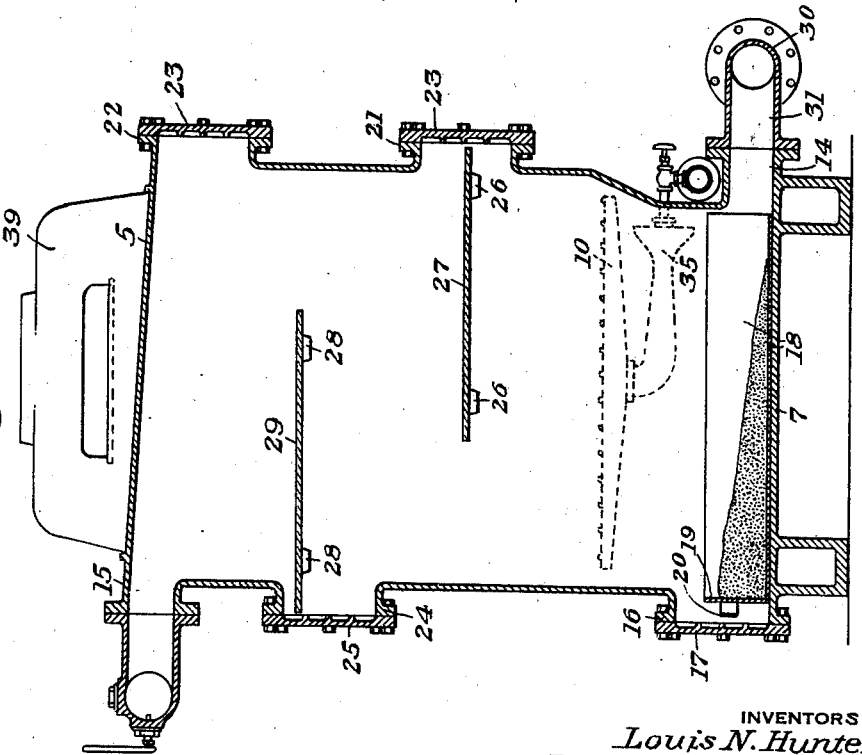
INVENTORS
Louis N. Hunter
Bidermann T. DuPont Patented Jan. 20, 1942

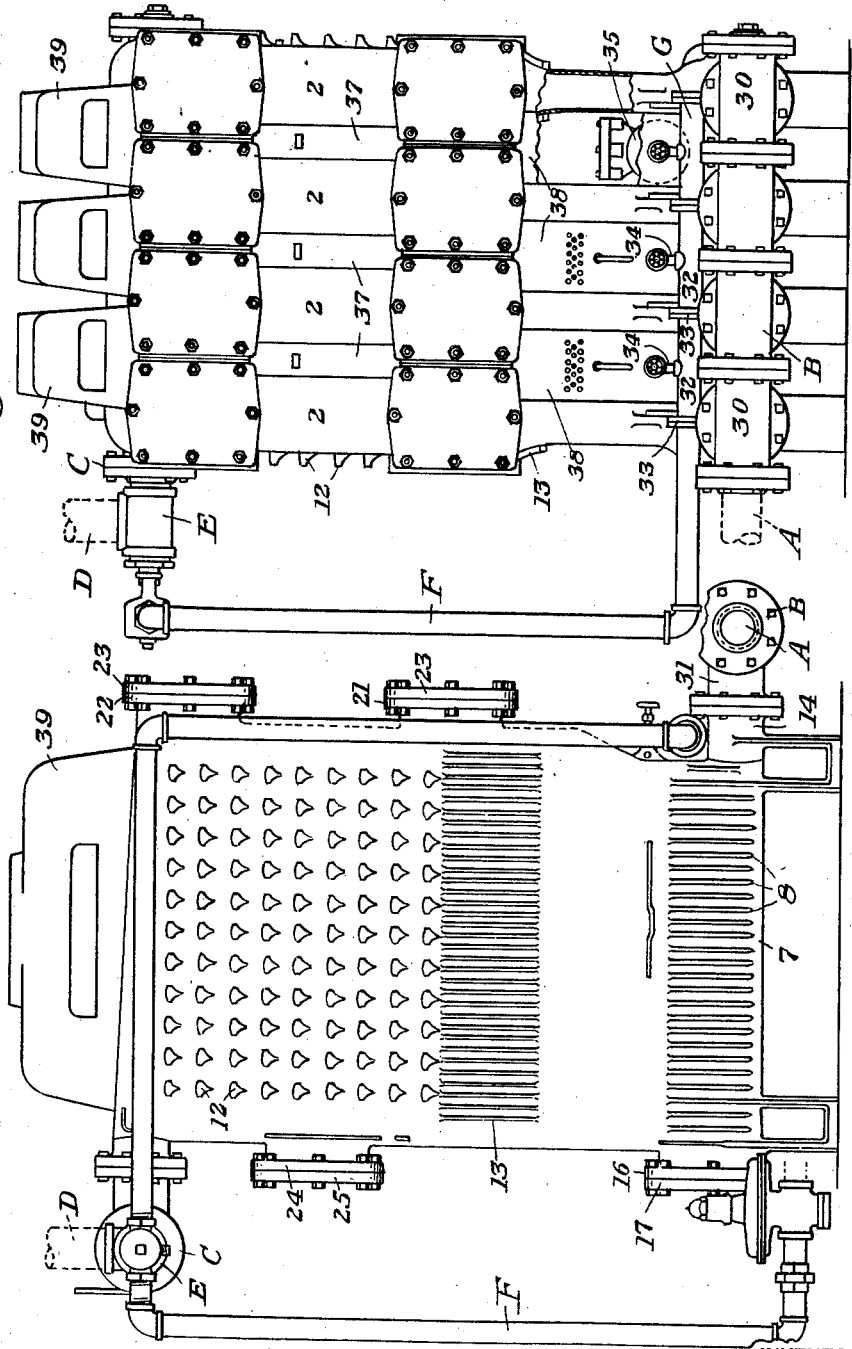

2,270,440

UNITED STATES PATENT OFFICE 2,270,440

APPARATUS FOR HEATING LIQUIDS

Louis N. Hunter and Bidermann T. du Pont, Johnstown, Pa., assignors to The National Radiator Company, Johnstown, Pa., a corporation of Maryland Application November 24, 1939, Serial No. 305,816

8 Claims. (Cl. 122—210)

This invention is for an apparatus for heating liquids, and is for a sectional type of apparatus of this character especially designed for use in applying heat to emulsions of oil and water for effecting separation thereof. This apparatus often referred to in the art as a boiler, may be and preferably is used for directly heating emulsions by circulating the emulsion through it, or it may be used for heating water or other liquid that is in turn used to heat the emulsion.

In various oil fields the oil that is discharged from the wells is emulsified with water. It is the usual practice to treat the emulsion at some point near the well in order that the oil may be recovered and the water discarded, thus avoiding the necessity of transporting the water along with the fluid oil. This separation is in many cases effected by passing the emulsion through an appropriate heating device, the heat serving to break down the emulsion so that separation of the two fluids may thereafter be readily accomplished, and in some cases the emulsion is caused to flow through a bath of hot water in a tank to break down the emulsion, the water in the tank being heated by circulating it from the tank through a boiler and returning it to the tank. Louis N. Hunter's joint patent with Thomas A. Novotney No. 1,968,614 dated July 31, 1934 discloses a method for treating emulsions by direct heating, and Louis N. Hunter's joint patent with Thomas A. Novotney No. 1,998,167 dated April 16, 1935 discloses an apparatus for accomplishing the treatment of emulsions either by the direct heating method of Patent No. 1,968,614 or which may be used for heating the water in the indirect method, and the present invention constitutes an improvement in such apparatus.

The emulsion which is delivered to the heating apparatus for treatment in this manner often contains a considerable amount of silt, sand, earth and various foreign substances and minerals, such as salt crystals. We have found that in some cases with the apparatus as disclosed in Patent No. 1,998,167, foreign substances and impurities tend to collect in the sections of which the apparatus disclosed in said patents is comprised, these sections usually being formed of cast metal. The bottoms of these sections are heated directly by gas burners under them. The foreign substances and impurities in the emulsion when they precipitate to the bottom of the sections form an incrustation which retards the transfer of heat from the burners on the outside to the oil on the inside of the sections. This leads to over-heating of certain portions of the bottoms of the sections, and in some cases the cracking of the sections. The incrustation or deposit at this point also retards the efficiency of the apparatus because of the thermal insulating character of the deposit.

One object of the present invention is to provide an apparatus for this purpose wherein the lower portions of the sections which are preferably formed of cast iron are below the burners so that even though sediment as sand, shale, mud, etc. collect in the bottom of the sections, it will not interfere with the transfer of heat through the sections because such deposits and accumulation will be below the burners, and below the point of the direct applications of heat. Also, the arrangement provided by the present invention has the further advantage that since the heat is not applied to the sections in the zone where the sediment collects, the sediment is not incrusted or baked onto the walls of the sections to the same extent but will remain in a loose or free condition. The greater portion of the foreign material will therefore be washed or carried through the section by the fresh incoming fluids and carried out of the section along with fluids discharged from the apparatus to thereafter subsequently settle out. This has the double advantage of retarding the deposit or accumulation of such undesirable substances in the bottoms of the sections, enabling the sections to be operated for a longer period of time without being closed down for cleaning or repairs, and of causing dirt and foreign material to be carried over to apparatus adapted to effectively accomplish the separation of such foreign material from the oil.

Apparatus of this class as pointed out above is frequently used in or near the oil fields adjacent the point of production of the oil. In addition to being durable and capable of operating for relatively long periods of time without being cleaned out, the present invention has for a further purpose to provide a sectional heater for this class of work which is more completely flexible than equipment heretofore provided for this purpose. According to the present invention the equipment is so constructed that additional sections and all accessory parts may be very quickly added to take care of increased requirements of the units, or they may be removed and interchangeably used with other sections to an extent not heretofore possible. Our invention may be more fully understood by reference to the accompanying drawings in which Figure 1 is a side elevation of a heating unit embodying our invention;

Figure 2 is a front elevation thereof, a portion of the structure being broken away to illustrate the interior arrangement of parts;

Figure 3 is a longitudinal vertical section through one of the unit sections of which the heating device is comprised;

Figure 4 is a front elevation of a single unit section, the view being of the end of the section opposite from the end shown in Figure 2; and Figure 5 is a transverse vertical section through the two parallel units in the relation which they occupy to one another in an installation.

A heating installation embodying our invention comprises a plurality; i. e., two or more parallel sections, preferably formed of cast iron or a cast iron alloy. These sections, which are hollow, are designated 2 in the drawings and there are usually several of them in parallel relation. As best shown in Figures 3, 4 and 5, each section has a hollow upper part 3 with parallel side walls 4 and a closed top 5, this upper part extending through the greater portion of the height of the section. Below the upper part 3, the walls are narrowed inwardly providing a leg portion 6 of reduced width. At the bottom of the leg portion 6 there is preferably an enlarged sediment-receiving chamber 7 which chamber forms the closure for the bottom of the section. The portions 7 are preferably cast with reinforcing ribs 8 on the outsides thereof. Cast onto the side faces of the leg portion 6 are horizontal lugs or ledges 9. These ledges are provided for the purpose of supporting a gas burner 10 which rests on the ledges between two adjacent sections, as best shown in Figure 5.

In an installation the sections are placed side-by-side a slight distance from one another so that a flue 11 is provided between adjacent sections through which gases of combustion from the burner 10 may flow. The faces of the sections are provided with numerous small projections 12 that extend into this flue or passageway between the sections to absorb heat from the gases flowing between the sections and conduct such heat to the fluid on the interior of the sections. In addition to the projections 12, there may be fins 13 providing additional extended heat-absorbing surfaces.

Projecting forwardly from the bottom portion 7 of each section is a pipe connection 14, this connection preferably being a flanged connection as illustrated. The top portion 5 of each section preferably has a slight inclination to the rear as shown in Figure 3, and at the top of the back of each section there is a similar pipe connection 15. The connection 14 is for the incoming fluids and the pipe connection 15 is the discharge through which the heated fluids flow out of the section. At the rear end of the portion 7 of each section opposite the inlet connection 14 there is provided a flanged opening 16 with a removable cover plate 17, the opening 16 being a clean-out opening. To facilitate the removal of sediment from the section there may be a sediment tray 18 slidably fitted in the bottom part 7 of each section, this tray being open at its forward end but having a wall 19 at its rear and to which may be secured a handle 20.

Flanged openings 21 and 22 with cover plates 23 may be provided at different elevations on the front of the section and a similar opening 24 with a removable cover plate 25 may be provided at an intervening elevation on the rear of the section. The sections are preferably provided with interiorly extending lugs 26 in the general level of the opening 21 for supporting a removable baffle 27 and the sections may be provided with similar lugs 28 accessible through the opening 24 for supporting a similar but reversely arranged baffle plate 29. In some instances and under certain conditions it is desirable to use the two baffle plates 27 and 29, but under other conditions it may be desirable to omit one or both of these baffles. Flexibility in meeting all conditions encountered in the oil field is secured through the provision of this removable baffle construction.

The fluid to be heated, as for example, the crude emulsion in the direct heating process or the water in the indirect heating process, is supplied to the apparatus through a supply pipe A terminating in a manifold structure B at the front of the unit. The manifold structure B is fabricated from a series of flanged pipe T's placed in end-to-end relation, the length of the T's corresponding to the widths of the sections, the joints between the T's coinciding with the line of separation between adjacent sections. These T connections which are designated 30 have stem portions 31 which join to the connectors 14 at the bottom of the sections, the joints with the connectors 14 also being flanged joints, preferably bolted joints. With this type of manifold it is only necessary to add on an additional T section for each additional section that is added onto the installation, and when a section is removed from an installation, the T-shaped section is taken out of the manifold. A similar manifold arrangement is provided at C at the top of the unit at the rear thereof, this manifold being formed of similar T's similarly arranged for delivering the heated fluid to a discharge pipe D. A thermostatic valve E is shown between the pipe D and the manifold C fos controlling the flow of gas from the gas-supply line F to the burner manifold G. The burner manifold like the oil supply and discharge manifolds is also made up of flanged sections, these sections being designated 32. The sections are of the same length as the sections 30, but the joints between sections correspond to the planes of the longitudinal centers of the sections so that the joints 33 are midway between the joints of the sections 30. Each section 32 has a valved outlet connection 34 for supplying gas to a mixer 35 at the base of the burner 10. The gas-supply manifold has the same flexibility in permitting sections to be added or removed that the manifolds B and C possess so that with this arrangement sections can be very quickly and easily added or removed or transferred from one unit to another.

Referring to the said joint patent of Thomas A. Novotney and Louis N. Hunter No. 1,998,167, it will be noted that heretofore flexibility has been secured by having the fluid inlet and outlet connections lead only to the end section of the unit. The sections are provided with registering nipple ports so as to permit the flow of fluid transversely from one section to another. The present invention constitutes a considerable improvement insofar as flexibility is concerned because there are no nipple ports required in the sections themselves and there is no direct communication from the interior of one section to the interior of the other section. The construction described in said Patent No. 1,998,167 further requires that the end sections be different from the intermediate sections, whereas the present invention enables all sections to be identical.

This is an important advantage in that the operator in the oil field can assemble a treating unit from any sections that he has available without having on hand specially formed opposite end sections, and it is of advantage to the foundry because it is unnecessary to carry a stock of three different types of sections. In the present invention the spacing between the sections is determined by the provision of abutments on the side faces of the sections as best seen for example in Figure 4 where these abutments are designated 36. Removable cover plates 37 may be provided for closing the space at the front and the rear of the sections, these cover plates being generally similar to those shown in the prior patent above referred to, and adjacent the burners there may be other removable cover plates 38 with small openings therethrough, these cover plates affording access to the burners. Spanning the flue space between each pair of sections are individual draft hoods 39 for carrying off the combustion gases. By using individual draft hoods for each pair of sections, the flexibility of the structure for increase or decrease of the number of sections as required is maintained.

It is desirable in constructions of this kind that as much as possible of the foreign material entrained in the emulsion or other fluid being heated be carried through the apparatus into the discharge line and removed in subsequent treatment. With the present invention, by applying the heat to the sections above the bottoms of the sections, the foreign material which tends to deposit in the sections is not baked or hardened onto the sections and the inflowing liquid will tend to sweep much of this sediment through the equipment. Such sediment as does accumulate may be readily removed, especially where removable sediment trays 18 are provided. In addition, in the apparatus shown, the sediment accumulates below the burner so that it does not interfere with the conduction of heat through the walls of the sections nor cause local overheating and cracking of the sections. Our invention therefore has several advantages, first in that the accumulation of sediment is retarded and more of the sediment is swept through the apparatus. Second, in that the sediment which does accumulate can be readily removed. Third, in that the sediment even if it does accumulate, does not result in local over-heating or cracking of the sections. This arrangement further permits of greater flexibility in the use of the sections in that there is no direct communication from one section to another, and this flexibility is further increased through the use of sectional manifolds in the form of flanged T's to enable sections to be added or removed, the arrangement enabling all of the sections to be identical. By reducing the width of the sections in the zone or leg portion 6 above the bottom portion and below the upper portion, sufficient space is provided between the sections for burners of the necessary capacity, and adequate combustion space is provided. At the same time this reduction in the width of the sections causes the oil or other liquid to have the greatest velocity of flow in that part of the sections where the heat is most intense.

While we have illustrated and specifically described one present preferred embodiment of our invention, it will be understood that this is by way of illustration only and that various changes and modifications may be made therein according to the provisions of the specification and within the scope of the following claims, and it will be further understood that while the invention has been primarily developed for use in the treating of oil emulsions, it may be used in the heating of other liquids, especially in conditions where, as in the oil industry, flexibility in size of plants and in the setting up and dismantling of plants and ready interchangeability of parts is of importance.

We claim as our invention:

1. A heating apparatus for the heating and treatment of liquids comprising at least three hollow sections in side-by-side relation with spaces between the sections, each of said sections being generally symmetrical about a median longitudinal plane, burners between the sections above the bottoms thereof whereby the bottom portions of the sections are below the zone of direct heat supplied by the burners, and means for introducing liquid to be heated into the bottoms of the sections below the burners and removing it from the top.

2. A sectional heating unit of the class described comprising at least three hollow cast metal sections of panel-like form disposed edgewise in side-by-side relation, each of said sections being generally symmetrical about a median longitudinal plane, said sections being shaped to provide combustion chambers therebetween close to but above the bottoms of the sections whereby each section has a sediment zone below the combustion chamber, flue space being provided between the sections above the combustion chambers, burners in the combustion chambers above the sediment zones, fluid inlet connections opening into the sediment zones below the burners and at the front of each section, and a discharge connection in the upper part of each section.

3. A heating apparatus for the heating and treatment of liquids comprising at least three hollow sections of panel-like form in side-by-side relation, each of said sections being generally symmetrical about a median longitudinal plane, said sections having an upper portion, an intermediate portion of reduced thickness below the upper portion, and a sediment zone of greater thickness than the intermediate portion at the bottom of each section, said sections being spaced to provide gas-circulating spaces between the upper portions thereof, there being a combustion chamber formed between the sections between an intermediate portions thereof which are of reduced thickness, fuel burners in the combustion chambers above the sediment zones of the several sections, and means for introducing liquid to be heated into the lower portions of the sections and for removing it from the upper parts of the sections.

4. A sectional heating unit of the class described comprising a plurality of hollow cast metal sections of panel-like form disposed edgewise in side-by-side relation, there being combustion chambers between the sections above the lowermost portions thereof, and flue spaces between the sections above the combustion chambers, burners in the combustion chambers above the lowermost portions of the sections, said sections each having a connection at the bottom portion thereof, a manifold connected to said connections, the manifold being comprised of a plurality of detachably connected fittings of a width substantially equal to the distance between the centers of the sections and joined in the plane of separation of the sections, the upper portions of the sections also having a similar outlet connection on each section, and a second sectional manifold similar to the first connected to the said outlet connections.

5. A sectional heating unit of the class described comprising a plurality of hollow cast metal sections of panel-like form disposed edgewise in side-by-side relation, there being combustion chambers between the sections above the lowermost portions thereof, and flue spaces between the sections above the combustion chambers, burners in the combustion chambers above the lowermost portions of the sections, said sections each having a connection at the bottom portion thereof, a manifold connected to said connections, the manifold being comprised of a plurality of detachably connected fittings of a width substantially equal to the distance between the centers of the sections and joined in the plane of separation of the sections, the upper portions of the sections also having a similar outlet connection on each section, a second sectional manifold similar to the first connected to the said outlet connections, and a sectional manifold connected with the burners and comprised of fittings of a length equal to the distance between the centers of the sections and joined in a plane midway between the joints of said first section.

6. A section for sectional liquid heating apparatus comprising a hollow metal body of generally panel-like form having a lower portion forming a sediment chamber, an intermediate section of reduced thickness and an upper portion of greater thickness than said intermediate portion, said section having a pipe connection projecting forwardly from the bottom portion thereof, said section having a pipe connection projecting rearwardly from the upper part thereof, said section having a clean-out opening with a removable cover plate at the back of the bottom portion thereof opposite said inlet connection, and a removable sediment tray in the bottom portion of the section accessible through said clean-out opening, said tray being open at that end which is nearest the inlet connection.

7. A cast metal section for sectional liquid heating apparatus comprising a hollow cast metal body of generally panel-like form having a lower portion forming a sediment chamber, an intermediate section of reduced thickness and an upper portion of greater thickness than said intermediate portion, said section having a pipe connection projecting forwardly from the bottom portion thereof, and said section having a pipe connection projecting rearwardly from the upper part thereof, said section having removable baffles therein at different elevations above the bottom thereof, and clean-out openings formed in the section and provided with removable covers affording access to said removable baffles and removable cover plates over said clean-out openings.

8. A sectional heating unit comprising at least three hollow metal sections, said sections being of generally panel-like form and generally symmetrical about a median longitudinal plane and having enlarged lower portions forming sediment zones, intermediate leg sections of reduced thickness and upper portions of greater thickness than said intermediate leg sections, said sections being assembled in side-by-side relation so that the leg sections of reduced thickness form combustion chambers between the sections.

LOUIS N. HUNTER.
BIDERMANN T. du PONT.